United States Patent [19]

Wang et al.

[11] Patent Number: 5,720,597
[45] Date of Patent: Feb. 24, 1998

[54] MULTI-COMPONENT BLADE FOR A GAS TURBINE

[75] Inventors: Weiping Wang, Schenectady, N.Y.; William Elliot Bachrach, Bennington, Vt.; Wendy Wen-Ling Lin; Scott Roger Finn, both of Schenectady, N.Y.

[73] Assignee: General Electric Company, Schenectady, N.Y.

[21] Appl. No.: 593,757

[22] Filed: Jan. 29, 1996

[51] Int. Cl.$^6$ .................................... F04D 29/38
[52] U.S. Cl. ........................................ 416/229 A
[58] Field of Search ................... 416/224, 229 R, 416/229 A, 230, 241 R, 241 A

[56] References Cited

U.S. PATENT DOCUMENTS

| | | | |
|---|---|---|---|
| 2,775,426 | 12/1956 | Barrett, Jr. et al. | 416/229 A |
| 3,318,388 | 5/1967 | Bihlmire | 416/229 R |
| 3,695,778 | 10/1972 | Taylor . | |
| 3,903,578 | 9/1975 | Rothman . | |
| 4,118,147 | 10/1978 | Ellis . | |
| 4,289,449 | 9/1981 | Frister | 416/229 R |
| 4,470,862 | 9/1984 | More et al. | 416/230 |
| 4,594,761 | 6/1986 | Murphy et al. . | |
| 4,732,541 | 3/1988 | Hyll | 416/241 A |
| 4,935,277 | 6/1990 | Le Balc'h | 416/229 R |
| 4,995,788 | 2/1991 | Turnberg | 416/229 A |
| 5,022,824 | 6/1991 | Violette et al. | 416/230 |
| 5,129,787 | 7/1992 | Violette et al. | 416/229 A |
| 5,222,297 | 6/1993 | Graff et al. | 416/224 |
| 5,240,376 | 8/1993 | Velicki | 416/229 A |
| 5,248,242 | 9/1993 | Lallo et al. | 416/230 |
| 5,292,231 | 3/1994 | Lavzeille | 416/229 A |
| 5,340,280 | 8/1994 | Schilling | 416/229 A |
| 5,439,353 | 8/1995 | Cook et al. | 416/229 R |
| 5,486,096 | 1/1996 | Hertel et al. | 416/224 |

FOREIGN PATENT DOCUMENTS

| | | | |
|---|---|---|---|
| 80800 | 5/1963 | France | 416/229 R |
| 217668 | 6/1941 | Switzerland | 416/229 R |
| 92/02731 | 2/1992 | WIPO | 416/224 |

OTHER PUBLICATIONS

U.S. Patent Application Serial No. 08/257,602 filed May 23, 1994 by Jan C. Schilling, entitled "Unshrouded Blading for High Bypass Turbofan Engines".

U.S. Patent Application Serial No. 08/533,478, filed Sep. 25, 1995, by Howard et al., entitled "Partially-Metallic Blade for a Gas Turbine".

U.S. Patent Application Serial No. 08/533,477, filed Sep. 25, 1995, by Jan C. Schilling, entitled "Hybrid Blade for a Gas Turbine".

"Braiding of Hybrid Composite Propeller Blades" by R.F.J. McCarthy, *Plastics–Metals–Ceramics* edited by H.L. Hornfeld, Switzerland, 1990, pp. 127–142.

"Polymer Composite Applications to Aerospace Equipment" by R.F.J. McCarthy, *Composites Manufacturing* vol. 5, No. 2, 1994, pp. 83–93.

"by R. McCarthy, *European Chapter SAMPE International Conference Advanced Technology in Materials Engineering*," Cannes, France, Jan. 12–14, 1981.

"Metal Spar/Superhybrid Shell Comsite Fan Blades" by General Electric Company, Final Report Proposed for NASA under Contract #NAS3-20402.

*Primary Examiner*—John T. Kwon
*Attorney, Agent, or Firm*—Douglas E. Erickson; Marvin Snyder

[57] ABSTRACT

A lightweight, impact-resistant gas turbine blade, such as an aircraft engine fan blade, has an airfoil portion which includes a metal section and at least one foam section which together define a generally airfoil shape. The metal section extends from generally the blade root to generally the blade tip. A composite skin generally completely surrounds, and is bonded to, the metal section and the at-least-one foam section. Preferably, an erosion coating generally completely surrounds, and is bonded to, the composite skin.

11 Claims, 3 Drawing Sheets

MULTI-COMPONENT BLADE FOR A GAS TURBINE

BACKGROUND OF THE INVENTION

The present invention relates generally to gas turbines, and more particularly to a gas turbine blade composed of several components made from different materials.

Gas turbines include, but are not limited to, gas turbine power generation equipment and gas turbine aircraft engines. A gas turbine includes a core engine having a high pressure compressor to compress the air flow entering the core engine, a combustor in which a mixture of fuel and the compressed air is burned to generate a propulsive gas flow, and a high pressure turbine which is rotated by the propulsive gas flow and which is connected by a larger diameter shaft to drive the high pressure compressor. A typical front fan gas turbine aircraft engine adds a low pressure turbine (located aft of the high pressure turbine) which is connected by a smaller diameter coaxial shaft to drive the front fan (located forward of the high pressure compressor) and to drive an optional low pressure compressor (located between the front fan and the high pressure compressor). The low pressure compressor sometimes is called a booster compressor or simply a booster.

The fan and the high and low pressure compressors and turbines have gas turbine blades each including an airfoil portion attached to a shank portion. Rotor blades are those gas turbine blades which are attached to a rotating gas turbine rotor disc. Stator vanes are those gas turbine blades which are attached to a non-rotating gas turbine stator casing. Typically, there are alternating circumferential rows of radially-outwardly extending rotor blades and radially-inwardly extending stator vanes. When present, a first and/or last row of stator vanes (also called inlet and outlet guide vanes) may have their radially-inward ends also attached to a non-rotating gas turbine stator casing. Counterrotating "stator" vanes are also known. Conventional gas turbine blade designs typically have airfoil portions that are made entirely of metal, such as titanium, or are made entirely of a composite. The all-metal blades, including costly wide-chord hollow blades, are heavier in weight which results in lower fuel performance and requires sturdier blade attachments, while the lighter all-composite blades without a metal leading edge are more susceptible to damage from bird ingestion events. Known hybrid blades include a composite blade whose leading edge is protected by metal (with the rest of the blade covered by a non-metallic coating) for erosion and bird impact reasons. The fan blades typically are the largest (and therefore the heaviest) blades in a gas turbine aircraft engine, and the front fan blades are the first to be impacted by a bird strike. What is needed is a gas turbine blade, and especially a gas turbine fan blade, which is both lighter in weight and better resistant to damage from bird ingestion events.

SUMMARY OF THE INVENTION

The gas turbine blade of the invention includes a shank portion and an airfoil portion. The airfoil portion has a design operating temperature, a blade root attached to the shank portion, a blade tip, and a radial axis extending outward toward the blade tip and inward toward the blade root. The airfoil portion also includes a metal section, at least one foam section, and a composite skin. The metal section has a first mass density and radially extends from generally the blade root to generally the blade tip. The at-least-one foam section has a second mass density, is bonded to the metal section, and is generally rigid at the design operating temperature. The second mass density is less than the first mass density, and the metal section and the at-least-one foam section together define a generally airfoil shape. The composite skin generally completely surrounds, and is bonded to, the metal section and the at-least-one foam section.

Several benefits and advantages are derived from the gas turbine blade of the invention. The metal section of the blade's airfoil portion, radially extending generally the entire radial length of the blade, provides resistance to damage from birds striking the blade, such as a gas-turbine aircraft-engine fan blade. The at-least-one foam section provides low weight for the blade. The composite skin provides the final aerodynamic shape and ensures that the at-least-one foam section will not "pop out" from the metal section during a bird strike. The multi-component airfoil portion is easily repairable.

BRIEF DESCRIPTION OF THE DRAWINGS

The accompanying drawings illustrate a preferred embodiment of the present invention wherein.

DETAILED DESCRIPTION OF THE INVENTION

Figure 1:
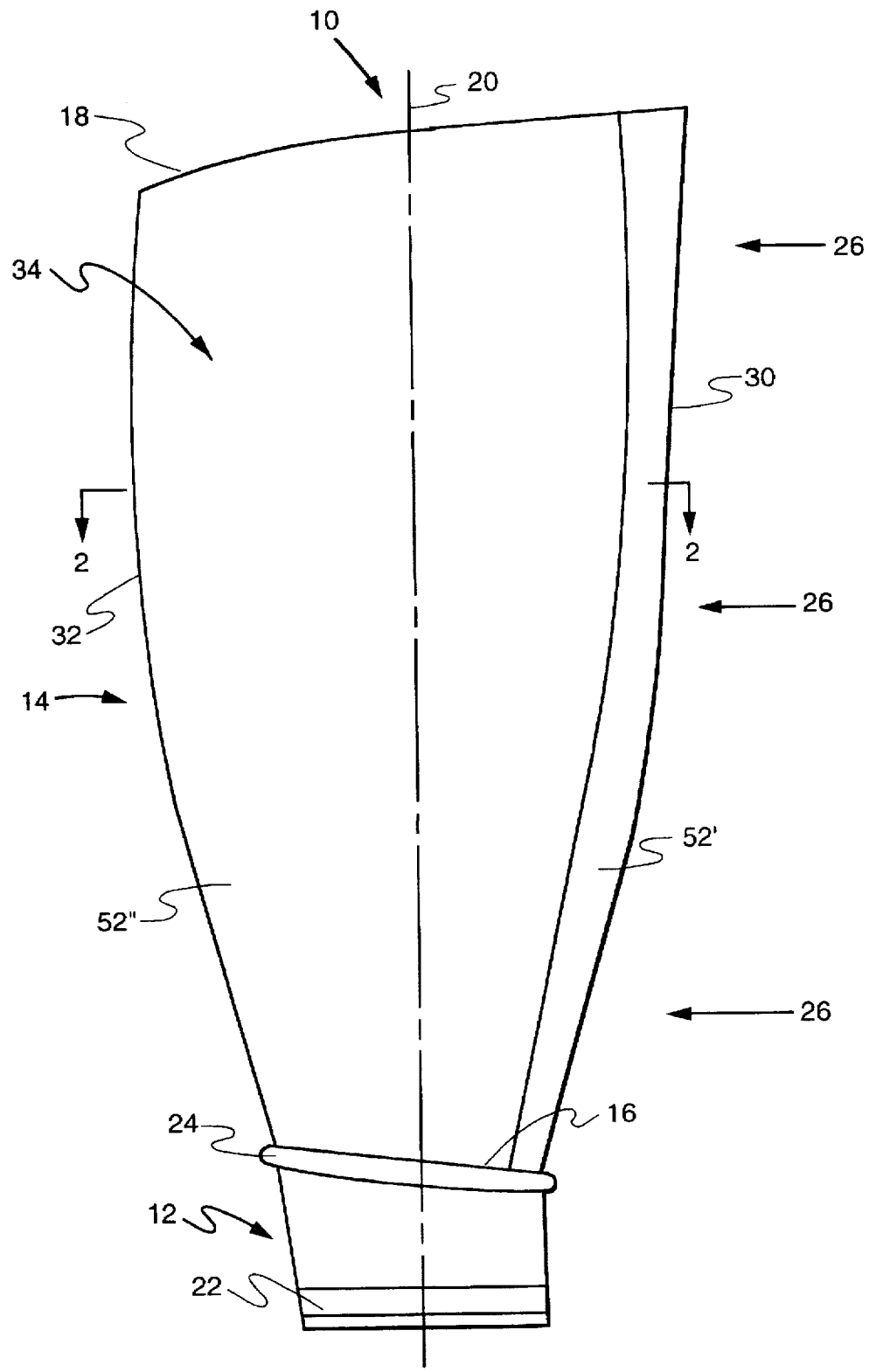
FIG. 1 is a schematic side-elevational view of the pressure side of a preferred embodiment of the gas turbine blade of the present invention in the form of a gas-turbine aircraft-engine fan blade.
Figure 2:
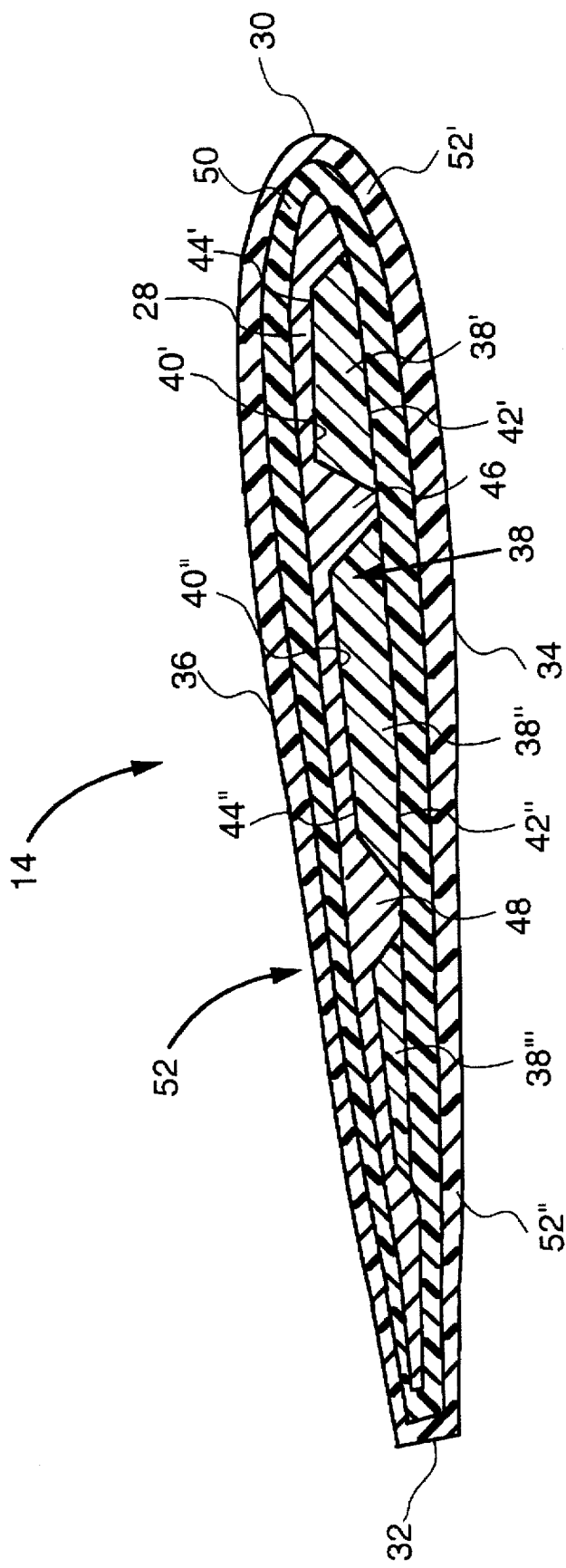
FIG. 2 is a schematic cross-sectional view of the airfoil portion of the gas turbine blade of FIG. 1, taken along lines 2—2 of FIG. 1.
Figure 3:
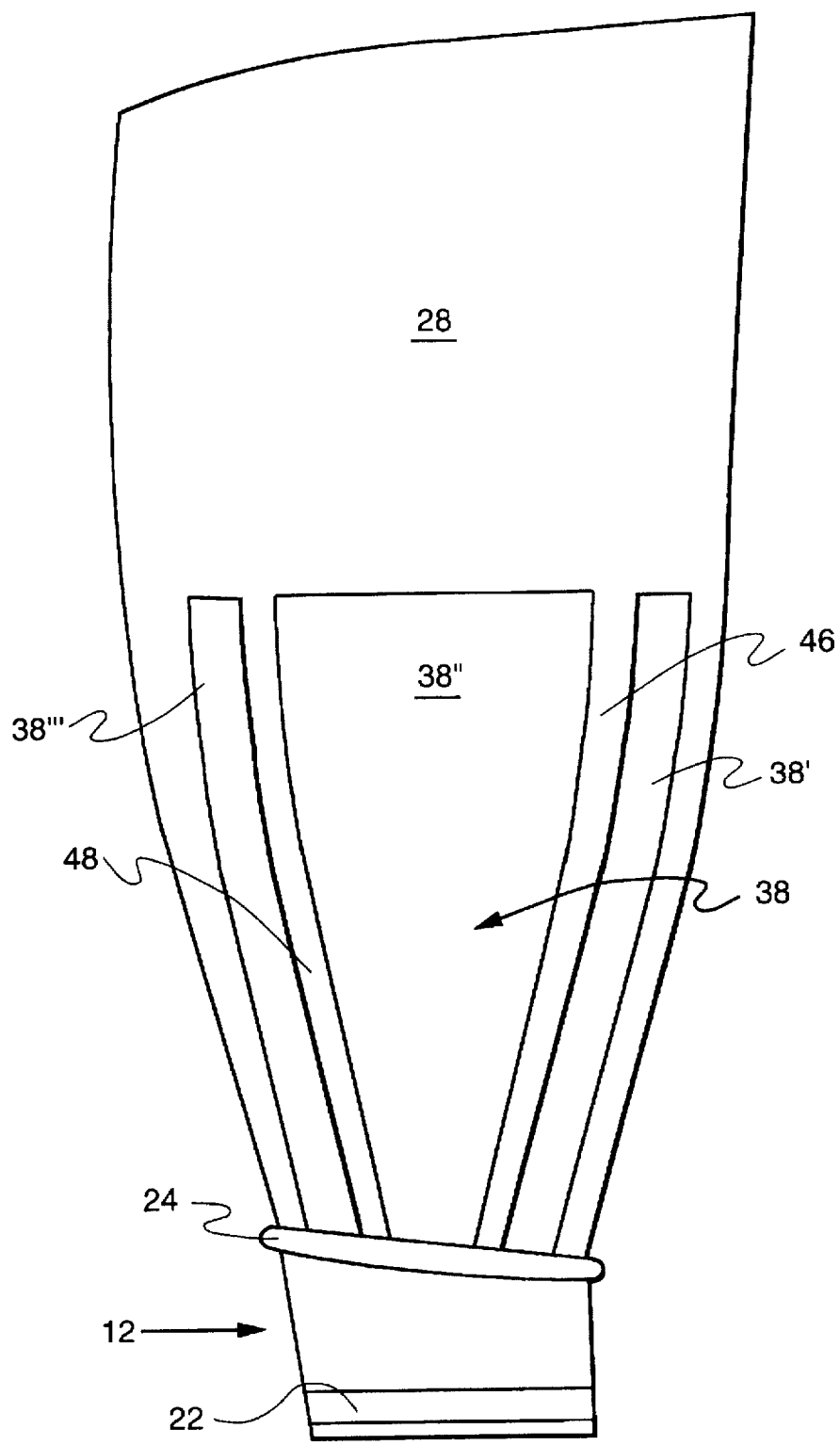
FIG. 3 is a view, as in FIG. 1, of the blade of FIG. 1, but with the erosion coating and the composite skin removed from the airfoil portion.

Referring now to the drawings, wherein like numerals represent like elements throughout, FIGS. 1 through 3 schematically show a preferred embodiment of the gas turbine blade 10 of the present invention. The gas turbine blade 10 includes a shank portion 12 and an airfoil portion 14. The airfoil portion 14 has a design operating temperature, a blade root 16 attached to the shank portion 12, a blade tip 18, and a radial axis 20 extending outward toward the blade tip 18 and inward toward the blade root 16. The design operating temperature is the maximum temperature the airfoil portion 14 is expected to experience during normal operation of the gas turbine (not shown). An example of a typical design operating temperature is, without limitation, between generally fifty and generally several-hundred degrees Centigrade. It is noted that the preferred embodiment shown in the figures is a gas-turbine aircraft-engine fan blade 10 wherein the shank portion 12 typically includes a dovetail 22, for attachment of the blade 10 to a rotor disc (not shown), and a blade platform 24, for helping to radially contain the air flow (the air flow direction being indicated by arrows 26 in FIG. 1). The airfoil portion 14 has a leading edge 30 and a trailing edge 32, wherein the air flow direction 26 is generally from the leading edge 30 to the trailing edge 32. The airfoil portion 14 also has a pressure (concave-shaped) side 34 and a suction (convex-shaped) side 36, wherein the gas turbine blade 10 rotates in a direction such that the pressure side 34 passes a reference point before the suction side 36 passes the same reference point.

The airfoil portion 14 also includes a metal section 28 (seen in FIGS. 2 and 3). By "metal section" is meant a section consisting essentially of (and preferably consisting of) a metal material other than a metallic foam. The term "metal" includes an alloy. Preferably, the metal section 28 is a monolithic metal section. In an exemplary embodiment, the metal material consists essentially of (and preferably consists of) titanium. Other choices for the metal material include, but are not limited to, aluminum, cobalt, nickel, or steel. The metal section 28 has a first mass density and radially extends from generally the blade root 16 to generally the blade tip 18. Even with lightweight metals, the first mass density of the metal section 28 typically is greater than generally two grams per cubic centimeter. It is noted that the metal section 28 has a first volume which increases with the desired size of the airfoil portion 14.

The airfoil portion 14 additionally includes at least one foam section 38 (seen in FIGS. 2 and 3). Preferably, the at-least-one foam section 38 comprises spaced-apart first and second foam sections 38' and 38". By "foam section" is meant a section consisting essentially of (and preferably consisting of) any material (including a polymer, ceramic and/or metal) having cellular structures (regardless of size, shape, uniformity, or content) dispersed generally throughout the entire section. In an exemplary embodiment, the at-least-one foam section 38 consists essentially of (and preferably consists of) polymers whose irregularly-shaped and preferably generally identically-sized generally $10^{-16}$ cubic-millimeter air-containing cavities are generally uniformly dispersed throughout the at-least-one foam section 38. Other choices for the foam material include, but are not limited to, metals, ceramics (honeycomb), or silicones, and mixtures thereof. The number and location of the foam sections is chosen by the artisan.

The at-least-one foam section 38 has a second mass density and is bonded to the metal section 28. Preferably, the second mass density is less than generally 1.5 gram per cubic centimeter. Preferably the bonding is accomplished by self adhesion or adhesion between the foam material and metal. Other examples of bonding include, without limitation, adhesive bonding and fusion bonding (adhesive film or paste). It is noted that the at-least-one foam section 38 has a second volume, and in an exemplary embodiment, the second volume is equal to at least generally twenty percent of the first volume of the metal section 28. The at-least-one foam section 38 is generally rigid at the design operating temperature of the airfoil portion 14. The second mass density of the at-least-one foam section 38 is less than the first mass density of the metal section 28. The metal section 28 and the at-least-one foam section 38 (which in the preferred embodiment shown in FIGS. 2 and 3 consists of the first, second, and third foam sections 38', 38", and 38'") together define a generally airfoil shape.

In an exemplary embodiment, the metal section 28 includes first and second surface recesses 40' and 40" each having an open top 42' and 42" and a closed bottom 44' and 44". It is preferred that the first and second surface recesses 40' and 40" each face the pressure side 34 of the airfoil portion 14. The first foam section 38' is disposed in the first surface recess 40', and the second foam section 38" is disposed in the second surface recess 40". Preferably, the metal section 28 includes a rib 46 disposed between, and bonded to, the first and second foam sections 38' and 38", wherein the rib 46 narrows from the closed bottoms 44' and 44" toward the open tops 42' and 42" of the first and second surface recesses 40' and 40". It is noted that a desired location for the at-least-one foam section 38 is toward the blade root 16 and not the blade tip 18. Having the blade tip 18 be proximate of the metal section 28 improves resistance to bird strikes for the necessarily narrower blade tip 18 area of the airfoil portion 14 and provides for better tip-rub protection. Preferably, the metal section 28 also is proximate generally entirely the leading edge 30 and generally entirely the trailing edge 32 and extends chordwise between proximate the leading and trailing edges 30 and 32. In an exemplary construction, the metal section 28 has no surface through-holes, no surface recesses other than those containing foam sections, and no internal voids. It is noted that additional ribs (such as additional rib 48) may be employed in the airfoil portion 14 for improved stiffness and to act as crack/delamination stoppers, and that the orientation of the ribs is left to the artisan.

The airfoil portion 14 further includes a composite skin 50 generally completely surrounding, and bonded to, the metal section 28 and the at-least-one foam section 38. By "composite skin" is meant any skin consisting essentially of (and preferably consisting of) a composite. A "composite" is defined to be a material having any (metal or non-metal) fiber filament embedded in any (metal or non-metal) matrix binder. The term "metal" includes an alloy. Preferably, the composite skin 50 is a layup of discrete composite laminations. In an exemplary embodiment, the composite consists essentially of (and preferably consists of) carbon, glass, or aramid filaments embedded in an epoxy (i.e., epoxy resin) matrix binder. Other choices for the composite include, but are not limited to, fiber-bismaleimide, fiber-polyimide, and other fiber-epoxy thermoset or thermoplastic resins and mixtures thereof wherein the fibers are glass, aramid, or graphite and mixtures thereof. Fiber-filament modulus and orientation are chosen to maintain overall airfoil-portion stiffness to minimize structural binding of the blade under centrifugal and aerodynamic load, as is within the level of skill of the artisan. Preferably the bonding of the composite skin 50 is accomplished by use of a separate adhesive film material or resin transfer molding or injection. Other examples of bonding include, without limitation, adhesion between the composite resin itself and the substrate.

It is noted that the composite skin 50 has a third volume, and that in an exemplary embodiment, the third volume is equal to no more than generally fifty percent of the sum of said first and second volumes (i.e., the combined volumes of the metal section 28 and the at-least-one foam section 38). The composite skin 50 has a third mass density. The second mass density of the at-least-one foam section 38 is less than the third mass density of the composite skin 50 which is less than the first mass density of the metal section 28. The blade design philosophy is to use the lightest materials possible in a blade design which will be resistant (to some desired degree) to bird strikes. The design goal of the artisan is to have a blade which minimizes the total weight as much as possible.

Preferably, the airfoil portion 14 moreover includes an erosion coating 52 generally completely surrounding, and bonded to, the composite skin 50. In a desired construction, the erosion coating 52 includes a metallic region 52' disposed only at generally the leading edge 30. It is preferred that the erosion coating 52 also include a non-metallic region 52" disposed from the metallic region 52' to generally the trailing edge 32. An example of a material for the non-metallic region 52" is, without limitation, polyurethane, and an example of a material for the metallic region 52' is, without limitation, titanium.

It is noted that the shank portion 12 preferably is a metal shank portion. However, a composite shank portion (suitably bonded or otherwise affixed to the airfoil portion) may be employed in particular blade designs. It is noted that the dovetail 22 of the shank portion 12 can be partially composite (not shown) on the pressure (concave) side. Alternatively, the dovetail 22 can have a metal wedge system (also not shown) to positively capture adjoining foam sections and provide a metallic dovetail wear surface.

It is further noted that the bird impact footprint is primarily over the area of the pressure side 34 near the leading edge 30, followed by the other areas of the pressure side 34. The effected areas of the composite skin 50 and the at-least-one foam section 38 provide buckling resistance. It is also noted that less containment structure (not shown) for the airfoil portion 14 is required since the at-least-one foam section 38 and the composite skin 50 will fragment and disbond from the metal section 28 under impact.

In a favored enablement, the composite and foam is mechanically or thermally removable from the metal section 28 at a temperature below the melting point of the metal material. This allows the airfoil portion 14 to be easily repairable should it become damaged due to bird strikes or foreign object impacts. If the airfoil portion is damaged in the composite and foam areas, the composite and foam would be thermally removed, the metal section 28 repaired, and new foam and composite reapplied. Since most of such blade damage is to the lead row of gas-turbine aircraft-engine blades 10, it is preferred, as previously noted, that the airfoil portion 14 is an airfoil portion of a gas-turbine aircraft-engine fan blade 10 (or the airfoil portion of a gas-turbine aircraft-engine compressor blade if the engine has no fan).

Preferred methods for making the gas turbine blade 10 of the invention include, but are not limited to, fabricating the metal section 28, the at-least-one foam section 38, and the composite skin 50 separately or as one unit (co-cured) using autoclave and compression mold techniques. The composite skin 50 is built up by manual or machine layering or by braiding around the metal-foam assembly, and then is resin transfer molded. It is noted, in contrast, that known all-composite blades are manually (and therefore expensively) layered. As previously mentioned, in the case of composite materials, fiber-filament modulus and orientation would be chosen to maintain overall airfoil-portion stiffness to minimize structural binding of the blade under centrifugal and aerodynamic load, as is within the level of skill of the artisan. It is noted that the metal section 28 preferably is forged, extruded, or cast, and that the surface recesses 40' and 40" preferably are further machined by chemical milling, electro-chemical machining, water-jet milling, or electro-discharge machining.

The foregoing description of several preferred embodiments of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

We claim:

1. A gas turbine blade comprising:
   a) a shank portion; and
   b) an airfoil portion having a design operating temperature, a blade root attached to said shank portion, a blade tip, and a radial axis extending outward toward said blade tip and inward toward said blade root, and wherein said airfoil portion also includes:
      (1) a metal section devoid of internal cavities and having a first mass density, wherein said metal section radially extends from generally said blade root to generally said blade tip, and wherein said solid metal section has at least one surface recess each with an open top and a closed bottom;
      (2) at least one foam section having a second mass density, disposed in a corresponding at least one surface recess, and bonded to said metal section, wherein said at least one foam section is generally rigid at said design operating temperature, wherein said second mass density is less than said first mass density, and wherein said metal section and said at least one foam section together define a generally airfoil shape; and
      (3) a composite skin generally completely surrounding, and bonded to, said metal section and said at least one foam section.

2. The gas turbine blade of claim 1, also including an erosion coating generally completely surrounding, and bonded to, said composite skin.

3. The gas turbine blade of claim 2, wherein said airfoil portion further includes a leading edge and a trailing edge, and wherein said erosion coating includes a metallic region, said metallic region disposed only at generally said leading edge.

4. The gas turbine blade of claim 3, wherein said erosion coating also includes a non-metallic region, said metallic region disposed from said non-metallic region said metallic region to generally said trailing edge.

5. The gas turbine blade of claim 1, wherein said at least one foam section comprises spaced-apart first and second foam sections.

6. The gas turbine blade of claim 5, wherein said airfoil portion has as pressure side and a suction side, wherein each at least one surface recess faces said pressure side, wherein said at least one surface recess includes first and second surface recesses, wherein said first foam section is disposed in said first surface recess, and wherein said second foam section is disposed in said second surface recess.

7. The gas turbine blade of claim 6, wherein said metal section also includes a rib disposed between, and bonded to, said first and second foam sections, and wherein said rib narrows from said closed bottoms toward said open tops of said first and second surface recesses.

8. The gas turbine blade of claim 1, wherein said second mass density is less than generally 1.5 gram per cubic centimeter.

9. The gas turbine blade of claim 8, wherein said metal section has a first volume and said at least one foam section has a second volume, and wherein said second volume is equal to at least generally twenty percent of said first volume.

10. The gas turbine blade of claim 9, wherein said composite skin has a third volume, and wherein said third volume is equal to no more than generally fifty percent of the sum of said first and second volumes.

11. A gas turbine blade comprising:
    a) a shank portion; and
    b) an airfoil portion having a design operating temperature, a blade root attached to said shank portion, a blade tip, and a radial axis extending outward toward said blade tip and inward toward said blade root, and wherein said airfoil portion also includes:
       (1) a metal section devoid of internal cavities and having a first mass density, wherein said metal section radially extends from generally said blade root to generally said blade tip, and wherein said solid metal has at least one surface recess each with an open top and a closed bottom;

(2) at least one other section which is not a metal section, said at least one other section having a second mass density, disposed in a corresponding at least one surface recess, and bonded to said metal section, wherein said at least one other section is generally rigid at said design operating temperature, wherein said second mass density is less than said first mass density, and wherein said metal section and said at least one other section together define a generally airfoil shape; and (3) a composite skin generally completely surrounding, and bonded to, said metal section and said at least one other section.

* * * * *